June 15, 1948.　　　　C. J. HERMAN　　　　2,443,457
DYNAMOELECTRIC MACHINE MEMBER
Filed July 25, 1947

Inventor:
Clairmont J. Herman,
by Prowell S. Hack.
His Attorney.

Patented June 15, 1948

2,443,457

UNITED STATES PATENT OFFICE 2,443,457

DYNAMOELECTRIC MACHINE MEMBER

Clairmont J. Herman, Fort Wayne, Ind., assignor to General Electric Company, a corporation of New York Application July 25, 1947, Serial No. 763,593

7 Claims. (Cl. 171—252)

This invention relates to members for dynamoelectric machines and more particularly to improved means for making interwinding and winding-to-lead connections and for securely anchoring these connections.

In the conventional construction of stator members for dyamoelectric machines, the connections between the ends of individual windings require insulation over the connection joints and also require lacing over the insulation to anchor the connection in place on the windings. In addition, the external leads to the windings are tied down by lacing in order to prevent tension on the lead from damaging the winding.

It is an object of this invention to provide an improved member for a dynamoelectric machine.

Another object of this invention is to provide improved means for making interwinding and winding-to-lead connections for dynamoelectric machines.

A further object of this invention is to provide improved means for anchoring interwinding and winding-to-lead connections of dynamoelectric machines.

A still further object of this invention is to provide an improved and simplified method of manufacturing members for dynamoelectric machines.

Further objects and advantages of this invention will become apparent and the invention will be better understood from the following description referring to the accompanying drawing, and the features of novelty which characterize this invention will be pointed out with particularity in the claims annexed to and forming a part of this specification.

A feature of this invention is the securing of the interwinding and winding-to-lead connections to the slot wedges, the connections being anchored in place by encasing them in a sleeve and tacking the sleeve to a portion of the slot wedge. This is an improvement over the invention of my copending application, Serial No. 763,-592 filed July 25, 1947, and claims broadly covering means secured to the slot wedges for making connections between coil groups and between winding ends and the external leads will be found therein.

Figure 1:
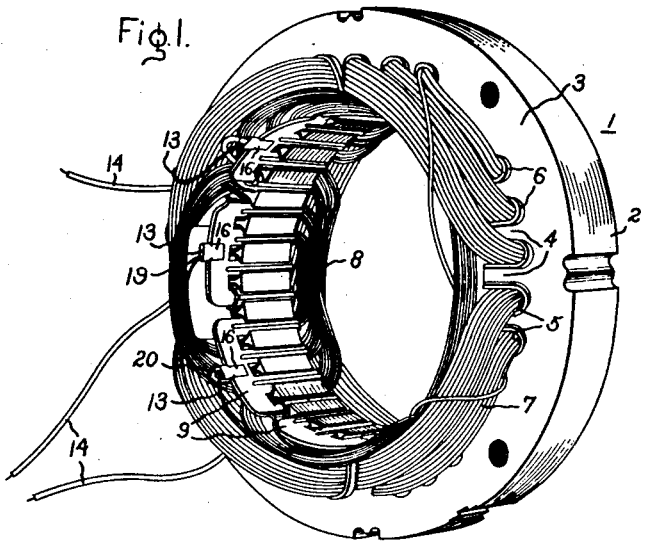
Figure 2:
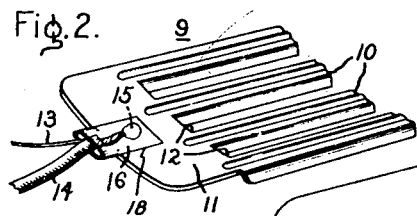
Figure 3:
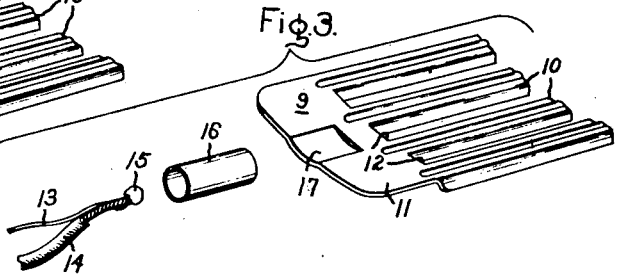
Figure 4:
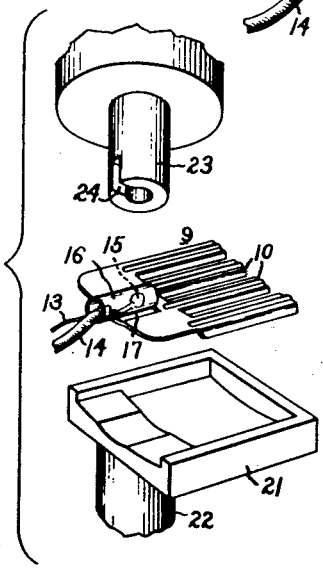
Figure 5:
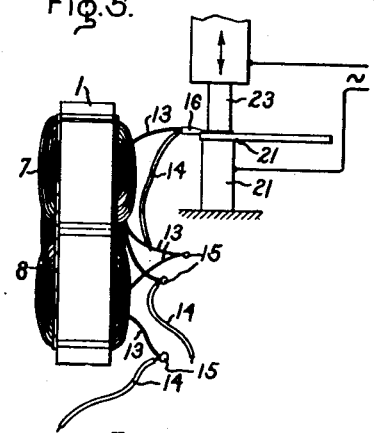

In the drawing, Fig. 1 is a perspective view of a stationary member for a dynamoelectric machine incorporating the improved interwinding and winding-to-lead connection and anchoring means of this invention. Fig. 2 is a detailed illustration of a completed winding-to-lead connection made on a slot wedge. Fig. 3 is an exploded view of the connection of Fig. 2 prior to assembly. Figs. 4 and 5 illustrate a method of making the connection shown in Fig. 2.

Referring now to Fig. 1, there is shown a stationary member or stator 1 for a dynamoelectric machine having a magnetizable core 2 which may be conventionally formed of a plurality of relatively thin laminations. The core consists of a main or yoke portion 3 having a plurality of teeth 4 extending radially inward therefrom to form a plurality of coil-winding slots 5. These slots are provided with liners 6 formed of insulating material such as is described in Patent 2,169,097 to Hall et al. and Patent 2,180,983 to Hall. These slot liners are formed from an extruded strip of material having cuffed or beaded edges which abut the sides of the slots 5. In the embodiment of the invention shown in Fig. 1, the slots are shown as containing superimposed layers of turns or sides of different coils, and specifically, the layer of coil sides of insulated motor running winding 7 and over that layer, a second layer of coil sides of insulated motor starting windings 8.

In order to provide for holding windings 7 and 8 in place and for closing the slots 5, slot wedge members 9 are positioned in the slots over the windings. These slot wedge members are more fully described in application Serial No. 763,591, filed July 25, 1947, of the present inventor and assigned to the assignee of this application. These members are molded of flexible resinous insulating material, preferably of nylon, which is defined as a superpolyamide resin, such as the reaction product of hexamethylene, diamine and adipic acid, or the reaction product of hexamethylene, diamine and sebacic acid. While nylon is the preferred material, any resinous plastic insulating material such as the vinyl resins and cellulose acetate can be utilized.

As shown in Fig. 2, the slot wedge members 9 are formed as a single unitary structure and include a plurality of slot wedge fingers 10 and a transverse annular flange portion 11 joining the wedge fingers at one end. While the wedge member is shown here as including four slot wedge fingers 10, it will be understood that any number of such fingers can be provided. Wedge members comprising from 1 to 36 slot wedge fingers have been used in the construction of motors of fractional horsepower frame sizes, however, it has been found that wedge members having from 2 to 4 slot wedge fingers are the most satisfactory from a cost and assembly standpoint. The provision of these multiple slot wedges reduces the tendency of the individual slot wedge fingers to twist and partially offset as they are inserted into the slots. In addition, this feature permits the insertion of a number of wedge members at one time thus greatly reducing the time required for assembly of the machine.

The slot wedge fingers 10 are formed of substantially U-shaped cross-section, the lips of the wedges abutting the interior walls of the slots 5 and the concave surface being formed toward the winding side of the slot. For motors of fractional horsepower frame sizes, the slot wedge fingers vary in overall length from approximately 1" to 5" depending upon the thickness of the stator punchings. For purposes of the present invention, for a slot wedge finger length of 1½", a satisfactory width of the transverse portion 11 was found to be ½". The friction of the wedges against the walls of the slots 5 hold the wedges securely in place, regardless of vibration, gravity, and centrifugal force. Thus the wedges firmly hold the windings in the slots and individual wires cannot creep past the wedges into the air gap of the machine.

The transverse portions 11 are curved to conform to the curvature of the stator member 1 and in assembly are substantially abutting to form a substantial annulus around the core 2 adjacent to the slots 5. On assembly, when the slot wedge fingers 10 are inserted in the slots 5, the inner edges 12 of the transverse portion 11 seat against the cuffed or beaded edges of the slot liners 6.

It will now be apparent that the construction as thus far described, through the provision of the transverse flange portions 11 of the slot wedge members 9, provides a secure location for interwinding and winding-to-lead connections of the machine. In order to accomplish this result, the ends 13 of the various windings are connected together in the appropriate relationship and welded or soldered, as for instance by a gas torch weld 15 to form the interwinding connections. In addition, the winding ends 13 and external leads 14 are similarly connected and welded together to form the winding-to-lead connections. Such a weld is shown in Figs. 2 and 3. A sleeve member 16 formed of resinous insulating material, similar to that used for the slot wedge members 9, is then placed over the welded connection. This sleeve is of sufficient length to cover the insulation of the lead 14 and effectively prevents fraying of the insulation. The sleeve also projects beyond the weld and, after assembly on the connection, is placed in the recess 17 in the flange 11 of the slot wedge member 9. The portions of the sleeve surrounding the weld 15 and extending beyond are then pinned or tacked down to the flange portion 11 by any suitable means such as a dielectric fusion weld, cementing, or mechanically stapling. The completed connection, as shown in Fig. 2 after completion of a dielectric fusion weld is firmly imbedded in a unitary flattened, fused structure, effectively anchoring the connection in place. A typical interwinding connection is shown at 19 in Fig. 1 and a typical winding-to-lead connection is shown at 20. Here, the end of the lead 14 is looped under the windings 7 and 8 in order to prevent the slot wedge member 9 from being pulled out by tension on the lead.

In Figs. 4 and 5, there is shown the preferred method of manufacturing the stator member shown in Fig. 1. The windings 7 and 8 are first positioned in the slots 5 and the winding ends 13 connected together and welded to form the interwinding connections and the winding ends 13 and the exterior leads 14 connected together and welded to form the winding-to-lead connections.

The slot wedge members 9, which are to have no connections made thereon, are next inserted to hold the windings in place. The slot wedge members to which connections are to be affixed are then placed in a suitable high frequency dielectric fusion welding apparatus, the slot wedge member being positioned on a lower electrode fixture 21 which in turn is secured to a stationary pedestal 22. The weld 15 at the end of the connection is then placed in the sleeve 16 which is in turn placed in the recess 17 in the flanged portion 11, as described above, and the upper moveable electrode 23 is pressed down firmly to flatten the portion of the sleeve surrounding and extending beyond the weld 15. The upper electrode 23 is provided with a slot 24 which receives the enlarged portion of the sleeve caused as the weld 15. The welding apparatus is then energized and it has been found that a frequency on the order of 11 megacycles at approximately 2 kw. for approximately 7 seconds produces a satisfactory fusion of the sleeve 16 into the flange 11. The fusion welding process having been completed, the slot wedge member with its fusion welded connection is inserted in the appropriate slots thus completing the stator member.

It will now be apparent that this improved construction eliminates the necessity for individual insulation over the connection joints between the winding ends of the winding leads since the joint is thoroughly insulated by the sleeve 16. In addition, since the connection is made on the flange of the slot wedge member which is securely positioned in the slot openings, and since the connection is anchored by the fusion weld of the sleeve to the flange, or by mechanically stapling the sleeve to the flange, the necessity for lacing to anchor the connections in place on the sides of the windings is also eliminated. The external leads to the machine are securely anchored, both by the fusion dielectric weld and their position underneath the windings thus eliminating the requirement for lacing to tie down these leads in order to prevent damage to the windings by excessive tension on the leads. This improved construction permits the entire elimination of end turn lacing and also eliminates failures of joint insulation and hidden connections which cannot be inspected. By providing positive, non-slip lead anchorages which facilitate the attainment of uniform lead-position and uniform length in mass production and due to the elimination of end-lacing, this construction greatly facilitates uniformity and speed of production thus substantially reducing the manufactured cost.

While I have illustrated and described a particular embodiment of this invention, modifications thereof will occur to those skilled in the art. I desire it to be understood, therefore, that this invention is not to be limited to the particular arrangements disclosed, and I intend in the appended claims to cover all modifications which do not depart from the spirit and scope of my invention.

What I claim as new and desire to secure by Letters Patent of the United States is:

1. In combination, a dynamoelectric machine having winding slots formed therein, coils forming windings positioned in said slots, slot wedge means for closing said slots and for holding said coils in place, said means being formed of resinous insulating material and having a portion extending beyond said slots, and means affixed to said slot wedge portions for securing the connections between the ends of groups of said coils and between the winding ends and the external leads to said windings, said last named means including sleeve means formed of resinous insulating material and encasing said connections, said sleeve means being fusion welded to said slot wedge portions whereby said coil-group and winding-to-lead connections are securely anchored in place.

2. In combination, a dynamoelectric machine having winding slots formed therein, coils forming windings positioned in said slots, slot wedge means for closing said slots and for holding said coils in place, said means being formed of insulating material and having a portion extending beyond said slots, and means affixed to said slot wedge portions for securing the connections between the ends of groups of said coils and the connections between the winding ends and the exterior leads to the windings, said last named means including sleeve means formed of insulating material and encasing said connections, said sleeve means being tacked to said slot wedge portions whereby said coil-group and winding-to-lead connections are securely anchored in place.

3. In combination, a dynamoelectric machine having winding slots formed therein, coils forming windings positioned in said slots, means for closing said slots and holding said coils in place including a portion extending beyond said slots, and sleeve means for encasing the connections between the ends of groups of said coils and the connections between said windings and the exterior leads to said windings, said sleeve means being secured to said slot closing means portions whereby said coil-group and winding-to-lead connections are securely anchored in place.

4. In combination, a dynamoelectric machine having winding slots formed therein, coils forming windings positioned in said slots, means for closing said slots and for holding said coils in place including a portion extending beyond said slots, and sleeve means for encasing the connections between the ends of groups of said coils and the connections between said windings and the exterior leads to said windings, said sleeve means being sufficiently long to extend beyond the end of said connections and to cover the insulation of said leads, said sleeve means being secured to said slot closing means portions whereby said coil-group and winding-to-lead connections are securely anchored in place.

5. In combination, a dynamoelectric machine having winding slots formed therein and coils forming windings positioned in said slots, a plurality of slot wedge means for closing said slots and for holding said coils in place including an annular portion extending beyond said slots, and sleeve means for encasing the connections between the ends of groups of said coils and the connections between said windings and the exterior leads to said windings, said connections being welded at their extremities, said sleeve means being sufficiently long to extend beyond the end of said weld and to cover the insulation of said leads, said sleeve means being secured to said slot wedge portions whereby said coil-group and winding-to-lead connections are securely anchored in place.

6. In combination, a dynamoelectric machine having winding slots formed therein and coils forming windings positioned in said slots, a plurality of slot wedge means for closing said slots and for holding said coils in place, said slot wedges being formed of resinous insulating material and having an annular portion extending beyond said slots, and sleeve means formed of resinous insulating material for encasing the connections between the ends of groups of said coils and the connections between said windings and the exterior leads to said windings, said connections being welded at their extremities, said sleeve means being sufficiently long to extend beyond the end of said weld and to cover the insulation of said leads, the portion of said sleeve means surrounding and extending beyond said connection weld being fusion welded to said slot wedge portion whereby said coil-group and winding-to-lead connections are securely anchored in place.

7. In combination, a dynamoelectric machine having winding slots formed therein and coils forming windings positioned in said slots, a plurality of slot wedge means for closing said slots and for holding said coils in place, said slot wedges being formed of resinous insulating material and having an annular flange portion extending beyond said slots, said flange portion having a recess formed in its surface at its outer edge, and sleeve means formed of resinous insulating material for encasing the connections between the ends of groups of said coils and the connections between said windings and the exterior leads to said windings, said connections being welded at their extremities, said sleeve means being sufficiently long to extend beyond the end of said weld and to cover the insulation of said leads, the portion of said sleeve means surrounding and extending beyond said weld being positioned in said flange portion recess and fusion welded to said flange portion whereby said coil-group and winding-to-lead connections are securely anchored in place.

CLAIRMONT J. HERMAN.